Aug. 19, 1969    E. NEGRI ETAL    3,461,664
REGULATING AND DRIVING DEVICE FOR CLOCKWORK
OF THE ELECTROMAGNETIC TYPE
Filed Feb. 27, 1967

United States Patent Office 3,461,664
Patented Aug. 19, 1969

3,461,664
REGULATING AND DRIVING DEVICE FOR CLOCKWORK OF THE ELECTROMAGNETIC TYPE
Emilio Negri, Via Vanvitelli 41, and Giorgio Cassera, Via Plinio 12, both of Milan, Italy
Filed Feb. 27, 1967, Ser. No. 618,933
Claims priority, application Italy, Dec. 5, 1966, 30,770/66
Int. Cl. G04c 3/04
U.S. Cl. 58—28    3 Claims

ABSTRACT OF THE DISCLOSURE

A regulating and driving device for clockwork of the electromagnetic type, comprising at least four magnetic poles, at least two coils diametrically opposed and equally spaced from the axis of the balance wheel, each of which has the working sides approximately perpendicular to the direction of motion of the balance wheel, the two coils belonging one to the input circuit and the other to the output circuit of a suitable electronic power amplifier, the assembly forming an electromagnetic system.

---

It is the object of the present invention to provide an electromagnetic device generating an oscillating motion, which consists of a balance wheel with at least four magnetic poles operating in combination with an electronic amplifier circuit preferably transistorized with at least two coils arranged diametrically opposed, one being the exciter coil and the other the driving coil, wherein the relative motion between the magnetic polarities and the active turns of the coils is such as to generate in the current driving coil a single pulse of current at each complete oscillation of the balance wheel, which is thus able to maintain its own oscillating motion without disturbing the isochronism.

The application of this device is of particular advantage in systems in which a low power and maximum exploitation of the current pulses induced in the driving coil is required in order to obtain a minimum consumption of electric energy.

Similar devices in which the two coils are coaxial and overlapping each other, while the magnetic poles of the balance wheel, two or four in number, are all arranged in a semicircumference of the balance wheel flywheel, are already known.

Other devices have instead the two coils arranged diametrically opposed, but the four magnetic poles of the balance wheel are such as to cause one or all of the drawbacks mentioned hereunder and relating to both of the abovementioned systems; considerable weight of the balance wheel, which, in certain cases, has to carry besides the magnets as many balancing weights; a low electromagnetic yield due to the considerable dimension of the magnetic air gap; and finally, generation of secondary pulses disturbing the isochronism, which have to be eliminated with circuits of special characteristics, which however, do not eliminate the other first mentioned defects.

The device according to the present invention enables one to increase the magnetic yield by reducing the air gap, to reduce the weight of the balance wheel which does not require balance weights at the magnets, owing to the uniform distribution of the pole pieces on the balance wheel and to eliminate generation of secondary pulses owing to the particular arrangement of the magnetic poles, with respect to the working sides of the circuit coils, in each of which, upon complete oscillation of the balance wheel through an angular displacement less than 360°, only two pulses of tension opposite in sign but of equal length and intensity are induced, which will be the maximum obtainable and will be generated when the balance wheel passes through the angular position which it occupies when the device is at rest.

The device according to the invention consists of at least four magnetic poles, at least two coils diametrically opposed and equally spaced from the balance wheel axis, each of which has the working sides approximately perpendicular to the direction of motion of the balance wheel, the two coils belonging one to the input circuit and the other to the output circuit of a conventional electronic power amplifier, the assembly forming an electromagnetic system characterized in that the magnetic poles are arranged on the flywheel of the balance wheel and are angularly equally spaced from each other, that the working sides of each single coil are angularly spaced from each other by an amount equal to the distance of two adjacent magnetic poles. The magnetic pole succession is such that when the balance wheel is in its rest position (that is balance position) in each of its two semicircumferences defined by the line passing through its centre and joining the radial mean axes of the two coils, there will be magnetic poles all of the same sign, said sign being opposite to the sign of the magnetic poles located in the other semicircumference, the number of said poles being equal in the two semicircumferences induced in each of the two coils for a complete oscillation of the balance wheel of less than 360° amplitude, during each complete oscillation are two pulses of voltage opposite in sign, of equal magnitude and of time duration proportional to the speed of the balance wheel, said pulses being induced when the oscillating balance wheel passes through the angular position occupied when the device is at rest.

The operation of the device may be clearly understood with reference to the accompanying drawings which show several embodiments of the invention by way of example only and without limitation and in which.

Figure 1:
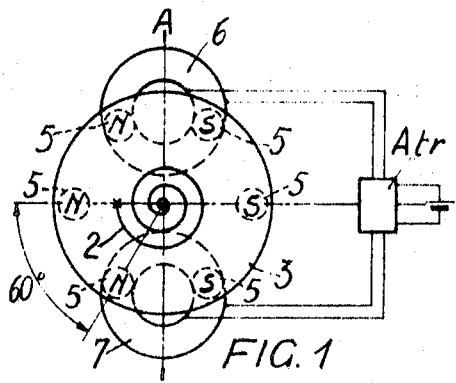
FIGURE 1 shows in a plan view a device having six magnetic poles.
Figure 2:
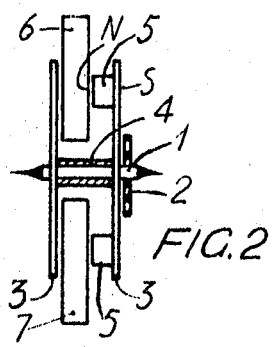
FIGURE 2 shows the same device in a side view.

In FIGURES 1 and 2 is shown a balance wheel according to the invention, in its rest position, which consists of axis 1, helical spring 2, flywheels comprising discs 3 connected to each other by the lining cylinder 4 and finally the magnetic poles 5. The flywheels 3 and the cylinder 4 are made of a material of highly magnetic permeability and together with the magnetic poles 5, form a magnetic circuit of high yield; the magnetic poles 5 have their magnetization axis in a direction parallel to the rotation axis and are arranged angularly equally spaced from each other and in such a succession that in each of the two semicircumferences of the balance wheel there is an equal number of magnetic poles of the same sign, but opposite in sign to those of the other semicircumference, the two semicircumferences being defined by the straight line A—A.

In the balance wheel air gap are arranged two coils 6 and 7 respectively located in the input circuit and in the output circuit of an electronic power amplifier generally indicated with A*tr*. Suitable amplifiers are already known, for example, transistor amplifiers, etc. Further details of the circuitry are not discussed since it will be obvious to one skilled in the art how to use such an amplifier in combination with the invention.

As may be seen, also coils 6 and 7 have their radial mean axis coinciding with the line A—A; they also have the active turns interacting with the magnetic poles which are angularly spaced from each other by an amount equal to two adjacent magnetic poles of the balance wheel, that means, in the instant embodiment, at 60°.

Supposing the balance wheel is oscillating at a normal rate, it is obvious that in the position shown in FIGURE 1, it receives from coil 7 a motion pulse, due to amplification, from amplifier A$tr$, of the pulse induced by coil 6.

Further, supposing that rotation takes place in an anticlockwise direction, it will appear that after 60° of rotation, over the working sides of coil 6 there will be two poles of S–S sign, while on those of coil 7 there will be two polarities N–N.

There will be the same conditions after another 60° of rotation, that is for a total of 120° of rotation, in the coils will not be generated pulses of tension disturbing the isochronism. After a further 60° rotation, that is 180° in total, on the turns of coil 6 will appear two magnetic poles of S–N sign, while on those of coil 7 the poles will have N–S sign, that means the opposite of the starting situation.

In this condition there should be in the coils a generation of tension; however, supposing the complete oscillation of the balance wheel is limited to 360° in total, at this point the balance wheel reverses the direction of its rotation, whereby its speed is equal to zero.

It ensues that the tension induced will also be equal to zero ($d\phi/dt=0$) and therefore no pulse disturbing the isochronism will be generated.

The same will take place for the rotation in the opposite direction to the one now considered; the only pulse induced will be generated in the coil when the balance wheel passes the point corresponding to its rest position, with the only difference that the tension of said pulse will be opposite in sign to the one generated in the preceding rotation.

To sum up, the balance wheel, at each complete oscillation of 360°, generates only two pulses of tension of the same intensity but opposite in sign in relation to its rest position.

Figure 3:
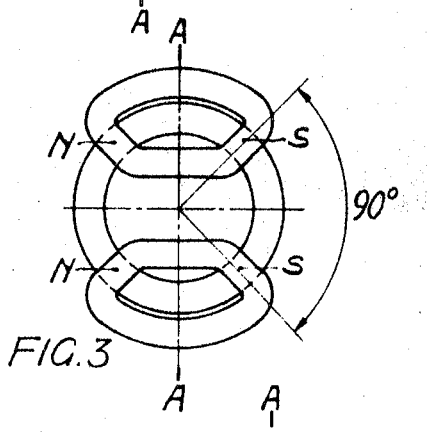
FIGURES 3, 4 and 5 show different embodiments.
Figure 5:
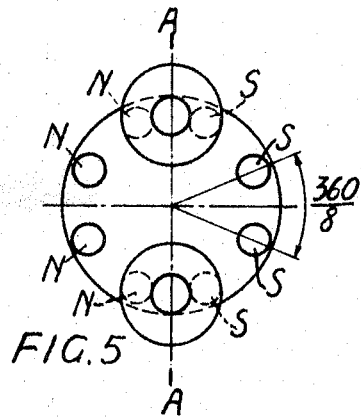
Figure 4:
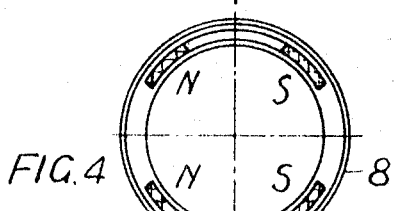
Figure 6:
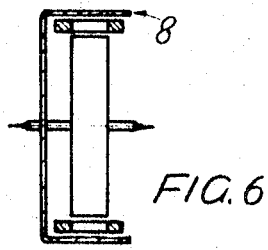
FIGURE 6 shows a section of FIGURE 4 embodiment, taken along line A—A.

Turning now to the other figures of the drawing, we note an embodiment in which the magnetic polarities are the minimum necessary, that is four in number (FIGURE 3). In FIGURES 4 and 6, instead, the difference resides in the fact that the magnetic poles are radially polarized, and the magnetic circuit consists, with them, of a soft iron ring 8. In FIGURE 5 is shown an example in which the dimensional difference between the balance wheel and the coils is considerable.

Figure 7:
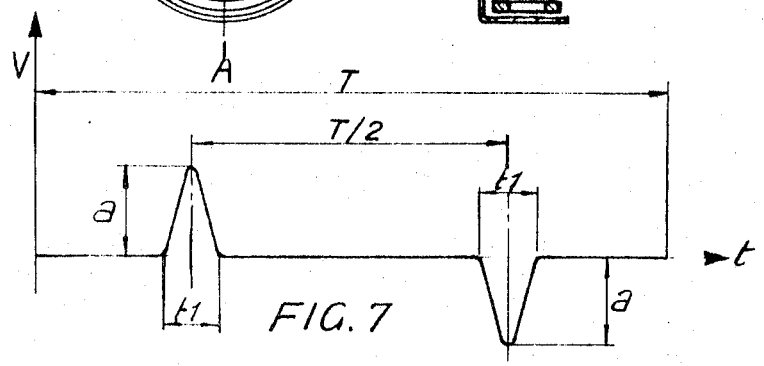
FIGURE 7 shows the shape of the pulses generated during a complete oscillation of the balance wheel of less than 360° of rotation.

In FIGURE 7 is shown the induced tension in one of the coils during the complete oscillation of the balance wheel, and in which with "T" is indicated the oscillation period, with "$t1$" the pulse duration, with "$T/2$" the gap between a pulse and the next one, and finally with "$a$" the voltage generated.

It should be understood, of course, that the foregoing disclosure relates only to preferred embodiments of the invention and that it is intended to cover all changes and modifications of the examples of the invention herein chosen, for purposes of disclosure, which do not constitute departures from the spirit and scope of the invention as set forth in the appended claims.

What is claimed is:

1. A regulating and driving device for clockwork of the electromagnetic type comprising, a balance wheel, means for supporting the balance wheel for rotative movement at least four magnetic pole pieces on the balance wheel, at least two coils diametrically opposed and equally spaced from the axis of rotation of the balance wheel with their working sides substantially perpendicular to the direction of motion of the balance wheel, one coil adapted to be connected to the input circuit of an electronic power amplifier and the other to the amplifiers output circuit, the magnetic pole pieces being equally angularly spaced from one another, and the working sides of each single coil being angularly spaced from each other by an amount equal to the spacing between the pole pieces, the arrangement being such that when the balance wheel is in rest position the polarity of the pole pieces to one side of a line joining the center of the coils and passing through the axis of rotation of the balance wheel is the same and is opposite to the polarity of the pole pieces on the other side of the line, whereby during a complete oscillation of less than 360° of the balance wheel, motion will be induced by two pulses of equal magnitude but of opposite polarity, the pulses occurring when the balance wheel passes through the position it normally occupies when the wheel is at rest.

2. A device according to claim 1 wherein the magnetic pole pieces have their magnetization axes parallel to the rotation axis of the balance wheel.

3. A device according to claim 1 wherein the magnetic pole pieces have their magnetization axes perpendicular to the rotation axis of the balance wheel.

References Cited

UNITED STATES PATENTS

| 3,381,467 | 5/1968 | Tsukagoshi et al. | 58—28 |
| 3,238,431 | 3/1966 | Raval | 58—28 |
| 3,184,623 | 5/1965 | Marti et al. | 58—28 |

RICHARD B. WILKINSON, Primary Examiner

E. C. SIMMONS, Assistant Examiner

U.S. Cl. X.R.

58—23